(12) United States Patent
Baright

(10) Patent No.: US 11,832,361 B2
(45) Date of Patent: Nov. 28, 2023

(54) LOW ELECTROMAGNETIC INTERFERENCE LIGHTING DEVICE WITH VARIABLE OUTPUT LEVELS

(71) Applicant: G&G LED, LLC, Clifton Park, NY (US)

(72) Inventor: Jason Baright, Clifton Park, NY (US)

(73) Assignee: G&G LED, LLC, Clifton Park, NY (US)

( * ) Notice: Subject to any disclaimer, the term of this patent is extended or adjusted under 35 U.S.C. 154(b) by 34 days.

(21) Appl. No.: 17/450,340

(22) Filed: Oct. 8, 2021

(65) Prior Publication Data

US 2022/0117057 A1    Apr. 14, 2022

Related U.S. Application Data

(60) Provisional application No. 63/091,066, filed on Oct. 13, 2020.

(51) Int. Cl.
*H05B 45/36* (2020.01)
*H05B 45/10* (2020.01)

(52) U.S. Cl.
CPC ............. *H05B 45/36* (2020.01); *H05B 45/10* (2020.01)

(58) Field of Classification Search
CPC ...... H05B 45/10; H05B 47/19; H05B 45/395; H05B 47/10; H05B 45/36; H05B 45/37; H05B 45/48; H05B 45/00; H05B 45/3725; H05B 45/20; H05B 45/40; H05B 45/50; H05B 45/46; H05B 45/58; H05B 45/375; H05B 45/397; H05B 45/39; H05B 45/345; H05B 45/38; H05B 45/385; H05B 45/44; H05B 45/12; H05B 44/00; H05B 45/14; H05B 45/35; H05B 45/3575; H05B 45/3578; H05B 45/56; H05B 47/11; H05B 41/16; H05B 45/24; H05B 45/31; H05B 45/325; H05B 45/355; H05B 45/59; H05B 47/105; H05B 47/115; H05B 47/18; F21V 23/003; F21V 23/0435; Y02B 20/30; H02M 7/12; H02M 1/44; F21K 9/00; F21K 9/278; F21K 9/66; F21K 9/61; H01L 25/0753; H01L 2224/48091; H01L 2224/48227; H01L 2224/48247; H01L 25/167; H01L 27/156; H01L 2924/12032; H01L 2924/12044; H01L 2924/1301; H01L 2924/13033; H01L 2924/1305; H01L 2924/13091; H01L 33/62; H01L 2924/00; H01L 2924/00014; H01L 33/36
See application file for complete search history.

(56) References Cited

U.S. PATENT DOCUMENTS

| | | | |
|---|---|---|---|
| 8,025,424 | B2 | 9/2011 | Mondloch et al. |
| 9,066,400 | B2 | 6/2015 | Clark |
| 9,316,370 | B2 | 4/2016 | Lax et al. |
| 9,642,201 | B2 * | 5/2017 | Lu ........................... H05B 45/10 |
| 9,642,202 | B2 | 5/2017 | Li et al. |
| 9,743,469 | B2 | 8/2017 | Delos Ayllon et al. |

(Continued)

FOREIGN PATENT DOCUMENTS

CN             204795794 U       11/2015

*Primary Examiner* — Monica C King
(74) *Attorney, Agent, or Firm* — Hoffman Warnick LLC

(57) ABSTRACT

The invention relates generally to lighting devices and, more particularly, to low electromagnetic interference (EMI) lighting devices with variable light output levels.

20 Claims, 2 Drawing Sheets

(56) References Cited

U.S. PATENT DOCUMENTS

| | | |
|---|---|---|
| 10,045,411 B2 | 8/2018 | Pan et al. |
| 10,485,073 B1 | 11/2019 | Hsia |
| 2011/0133655 A1* | 6/2011 | Recker .................. H05B 47/13 |
| | | 315/159 |
| 2015/0257227 A1* | 9/2015 | Lu ......................... H05B 45/10 |
| | | 315/201 |
| 2017/0223795 A1 | 8/2017 | Sadwick |
| 2019/0323663 A1* | 10/2019 | Rudy .................... H01S 5/0233 |
| 2022/0320819 A1* | 10/2022 | Rudy ....................... F21K 9/90 |

* cited by examiner dom # LOW ELECTROMAGNETIC INTERFERENCE LIGHTING DEVICE WITH VARIABLE OUTPUT LEVELS

CROSS-REFERENCE TO RELATED APPLICATIONS

This application claims priority to U.S. Provisional Patent Application Ser. No. 63/091,066, filed 13 Oct. 2020, which is hereby incorporated herein as though fully set forth.

BACKGROUND

There are many applications in which electromagnetic interference (EMI) is to be reduced as much as feasible. Lighting devices utilized in such applications are therefore typically low-EMI lighting devices. In some instances, however, it may be necessary to employ lighting devices with higher light output levels than are achievable with low-EMI lighting devices. This may make it necessary, in those instances, to bring in additional lighting devices to supplement the low-EMI lighting devices.

SUMMARY

In one embodiment, the invention provides a low electromagnetic interference (EMI) lighting device comprising: a light-emitting diode (LED) driver including a high-voltage linear constant current regulator; an LED module including at least one LED electrically connected to the LED driver; and a switching device electrically connected to the LED driver, the switching device being alternately deployable between a first position and a second position, wherein the at least one LED has a first output level when the switching device is deployed in the first position and a second output level when the switching device is deployed in in the second position, the first output level being greater than the second output level.

In another embodiment, the invention provides a lighting system comprising: an electrical power source; and a plurality of low electromagnetic interference (EMI) lighting devices connected to the electrical power source, at least one of the plurality of low EMI lighting devices comprising: a light-emitting diode (LED) driver including a high-voltage linear constant current regulator; an LED module including at least one LED electrically connected to the LED driver; and a switching device electrically connected to the LED driver, the switching device being alternately deployable between a first position and a second position, wherein the at least one LED has a first output level when the switching device is deployed in the first position and a second output level when the switching device is deployed in in the second position, the first output level being greater than the second output level.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
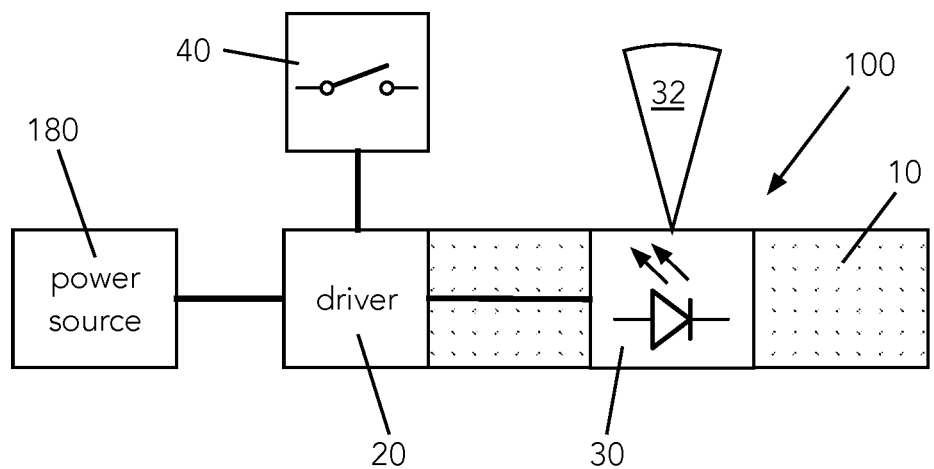
FIG. 1 is a schematic view of a lighting system according to one embodiment of the invention, the lighting system outputting a first output level.

FIG. 1 is a schematic view of a low EMI lighting device 100 according to an embodiment of the invention. Lighting device 100 includes a light-emitting diode (LED) driver 20 having a high-voltage linear constant current regulator (not shown) as is known in the art. Lighting device 100 further includes an LED module 10 having at least one LED 30 electrically connected to the LED driver 20. In some embodiments, the LED 30 and/or LED module 10 are removable from the lighting device 100.

The lighting device 100 is itself connected to an electrical power source 180, as is known in the art.

Lighting device 100 further includes a switching device 40 electrically connected to the LED driver 20, the switching device 40 being alternately deployable between a first position and a second position. The switching device 40 may be alternately deployable between the first and second positions manually, as with a typical electrical switch as known in the art. Alternatively, the switching device 40 may be so deployable using a wireless signal, as also known in the art.

As shown in FIG. 1, with the switching device 40 deployed in the first position, LED 30 has a first output level 32.

Figure 2:
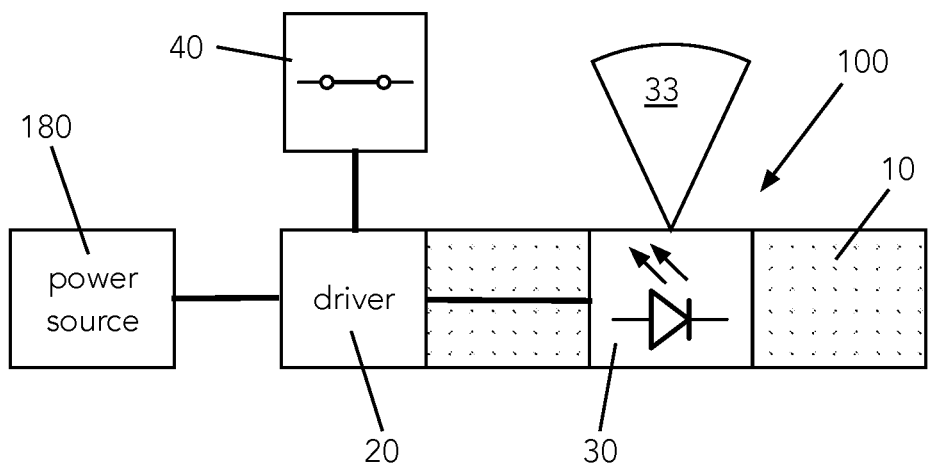
FIG. 2 is a schematic view of the lighting system of FIG. 1 outputting a second output level.

In FIG. 2, the switching device 40 is deployed in the second position, which increases the voltage delivered from the LED driver 20 the LED 30, such that LED 30 has a second output level 33 that is greater than the first output level 32 (FIG. 1).

According to some embodiments of the invention, the first output level is between 250 lumens and 2,000 lumens, while the second output level is between 2,000 lumens and 10,000 lumens. In such embodiments, the EMI is less than or equal to 24 dBµV/m at the first output level, e.g., between 20 dBµV/m and 24 dBµV/m, while the EMI is less than or equal to 30 dBµV/m at the second output level, e.g., between 24 dBµV/m and 30 dBµV/m.

Thus, lighting device 100, while being a low EMI lighting device, can be employed having variable lighting output levels, making it useful in low EMI applications where, from time to time, a greater light output level may be required.

Figure 3:
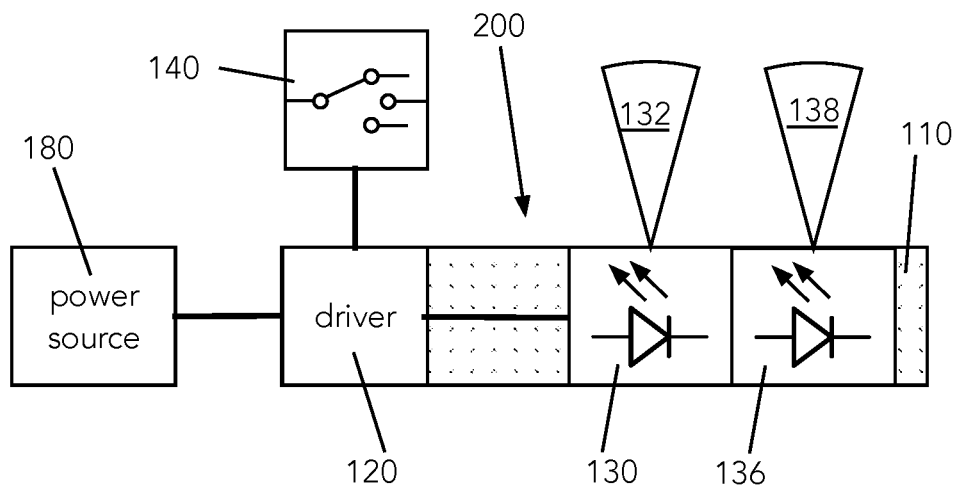
FIG. 3 is a schematic view of a lighting system according to another embodiment of the invention, the lighting system including a plurality of lighting devices, each outputting a first output level.

FIG. 3 is a schematic view of a low EMI lighting device 200 according to another embodiment of the invention. Here, the LED module 110 includes two LEDs 130, 136 and the switching device 140 is deployable between a first position, a second position and a third position. In FIG. 3, the switching device is deployed in the first position, such that the first LED 130 and the second LED 136 each has a first output level 132, 138, respectively.

Figure 4:
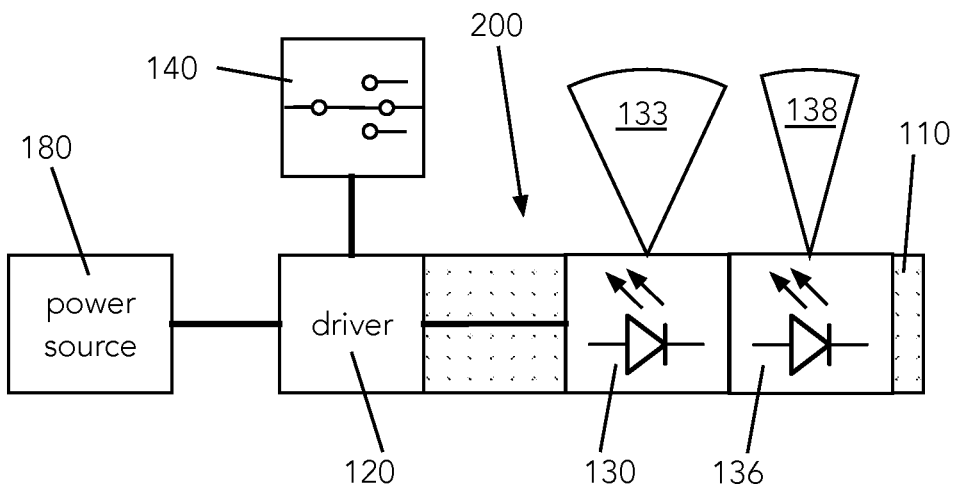
FIG. 4 is a schematic view of the lighting system of FIG. 3, each of the plurality of lighting devices outputting different output levels.

In FIG. 4, the switching device 140 is deployed in the second position, such that the first LED 130 has a second output level 133 and the second LED 136 has the same first output level 138, the second output level 133 being greater than the first output level 132 (FIG. 3).

Figure 5:
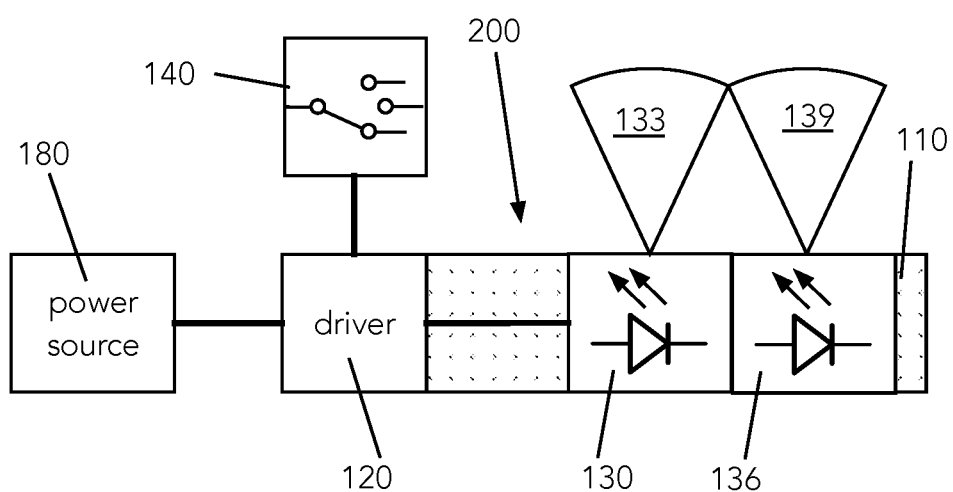
FIG. 5 is a schematic view of the lighting system of FIG. 3, each of the plurality of lighting devices outputting a second output level.

Finally, in FIG. 5, the switching device 140 is deployed in the third position, such that both the first LED 130 and the second LED 136 have the second output level 133, 139, respectively.

Thus, the embodiment shown in FIGS. 3-5 is operable to provide three different combined output levels, the first output level in FIG. 3, the second, greater, output level in FIG. 4, and the third, still greater, output level in FIG. 5.

Figure 6:
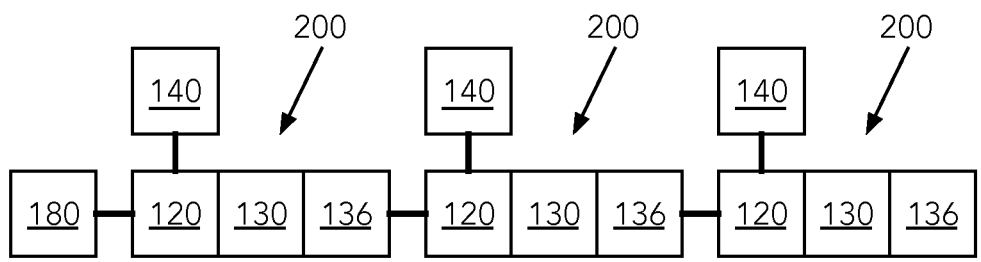
FIG. 6 is a simplified schematic view of a lighting system comprising a plurality of low EMI lighting devices according to an embodiment of the invention.

FIG. 6 is a simplified schematic of a lighting system according to an embodiment of the invention comprising a plurality of lighting devices 200. Although the lighting devices 200 are shown connected to the electrical power supply 180 in series, one skilled in the art would understand that some or all of the lighting devices 200 could be so connected in parallel.

In the lighting system of FIG. 6, the switching devices 140 of each lighting device 200 may be operated independently, such that an even greater number of combined lighting output levels may be achieved.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A low electromagnetic interference (EMI) lighting device comprising:
a light-emitting diode (LED) driver including a high-voltage linear constant current regulator;
an LED module including at least one LED electrically connected to the LED driver; and
a switching device electrically connected to the LED driver, the switching device being alternately deployable between a first position and a second position,
wherein the at least one LED has a first output level when the switching device is deployed in the first position and a second output level when the switching device is deployed in in the second position, the first output level being less than the second output level,
wherein the EMI of the lighting device is less than or equal to 30 dBµV/m at the second output level.

2. The low EMI lighting device of claim 1, wherein the LED module is removable from the lighting device.

3. The low EMI lighting device of claim 1, wherein the first output level is between 250 lumens and 2,000 lumens; and the second output level is between 2,000 lumens and 10,000 lumens.

4. The low EMI lighting device of claim 1, wherein the EMI of the lighting device is between 24 dBµV/m and 30 dBµV/m at the second output level.

5. The low EMI lighting device of claim 1, wherein the switching device is alternately deployable between a first position, a second position, and a third position.

6. The low EMI lighting device of claim 5, wherein the at least one LED has a third output level when the switching device is deployed in the third position, the third output level being greater than the first output level, the second output level, or both.

7. The low EMI lighting device of claim 1, wherein the switching device is alternately deployable between the first position and the second position by a wireless signal.

8. A lighting system comprising:
an electrical power source; and
a plurality of low electromagnetic interference (EMI) lighting devices connected to the electrical power source, at least one of the plurality of low EMI lighting devices comprising:
a light-emitting diode (LED) driver including a high-voltage linear constant current regulator;
an LED module including at least one LED electrically connected to the LED driver; and
a switching device electrically connected to the LED driver, the switching device being alternately deployable between a first position and a second position,
wherein the at least one LED has a first output level when the switching device is deployed in the first position and a second output level when the switching device is deployed in in the second position, the first output level being greater than the second output level,
wherein the EMI of the lighting device is less than or equal to 24 dBµV/m at the first output level.

9. The lighting system of claim 8, wherein the LED module is removable from the lighting device.

10. The lighting system of claim 8, wherein the LED module is removable from the lighting device without disconnecting the at least one low EMI lighting device from the electrical power source.

11. The lighting system of claim 8, wherein the first output level is between 250 lumens and 2,000 lumens; and the second output level is between 2,000 lumens and 10,000 lumens.

12. The lighting system of claim 8, wherein the EMI of the lighting device is between 20 dBµV/m and 24 dBµV/m at the first output level.

13. The lighting system of claim 8, wherein the EMI of the lighting device is less than or equal to 30 dBµV/m at the second output level.

14. The lighting system of claim 8, wherein the EMI of the lighting device is between 24 dBµV/m and 30 dBµV/m at the second output level.

15. The lighting system of claim 8, wherein the switching device is alternately deployable between a first position, a second position, and a third position.

16. The lighting system of claim 15, wherein the at least one LED has a third output level when the switching device is deployed in the third position, the third output level being greater than the first output level, the second output level, or both.

17. The lighting system of claim 8, wherein the switching device is alternately deployable between the first position and the second position by a wireless signal.

18. The lighting system of claim 8, wherein the switching device of each of the plurality of low EMI lighting devices is operable independently of each other switching device.

19. A low electromagnetic interference (EMI) lighting device comprising:
- a light-emitting diode (LED) driver including a high-voltage linear constant current regulator;
- an LED module including at least one LED electrically connected to the LED driver; and
- a switching device electrically connected to the LED driver, the switching device being alternately deployable between a first position and a second position,
- wherein the at least one LED has a first output level when the switching device is deployed in the first position and a second output level when the switching device is deployed in in the second position, the first output level being less than the second output level,
- wherein the EMI of the lighting device is less than or equal to 24 dBμV/m at the first output level.

20. The low EMI lighting device of claim 19, wherein the EMI of the lighting device is between 20 dBμV/m and 24 dBμV/m at the first output level.

\* \* \* \* \*